Figure 1:
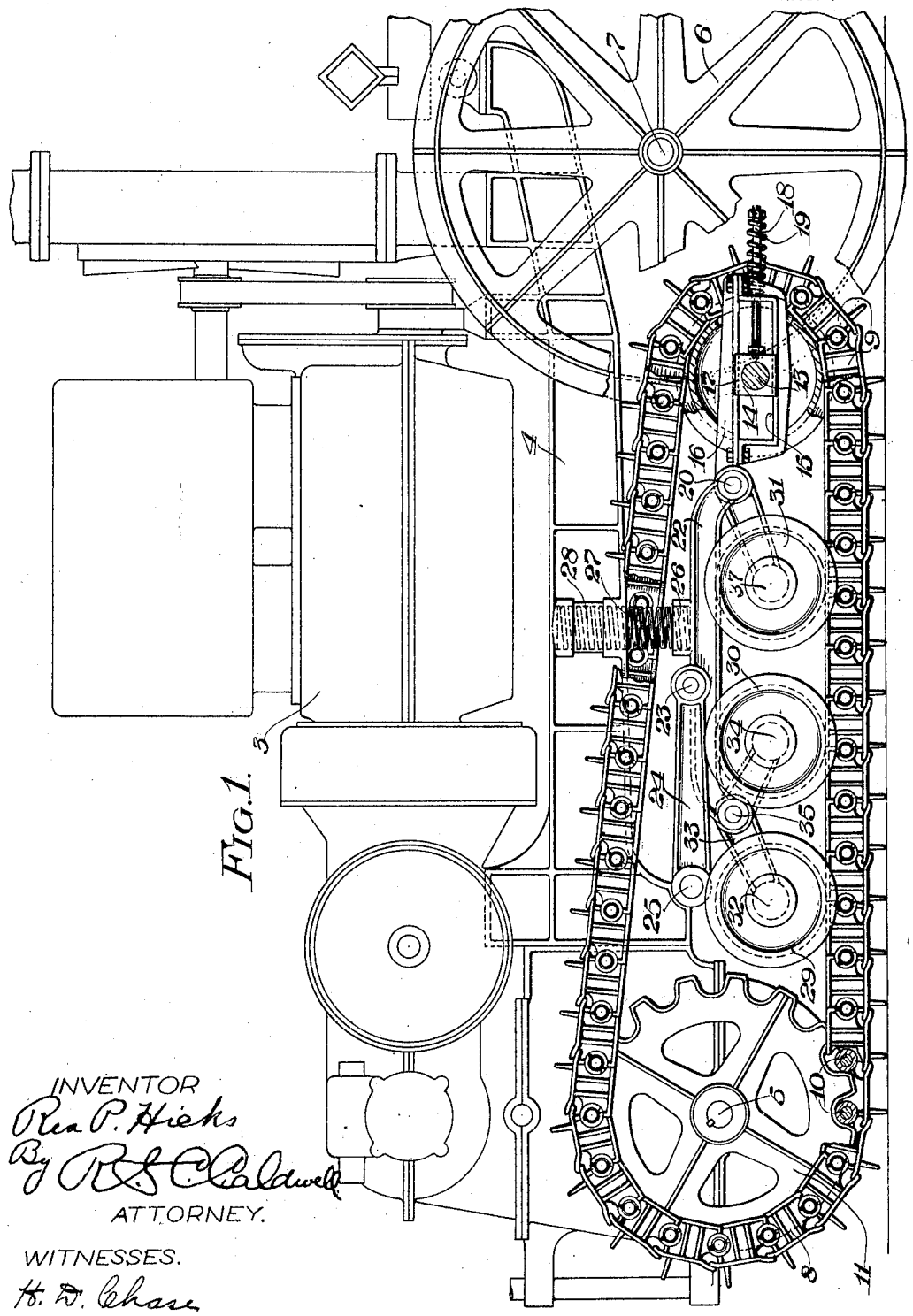

R. P. HICKS.
TRACTOR TREAD.
APPLICATION FILED MAY 12, 1919.

1,392,417.

Patented Oct. 4, 1921.
2 SHEETS—SHEET 1.

INVENTOR
Rea P. Hicks
By R. S. Caldwell
ATTORNEY.

WITNESSES.
H. D. Chase
C. L. Haal

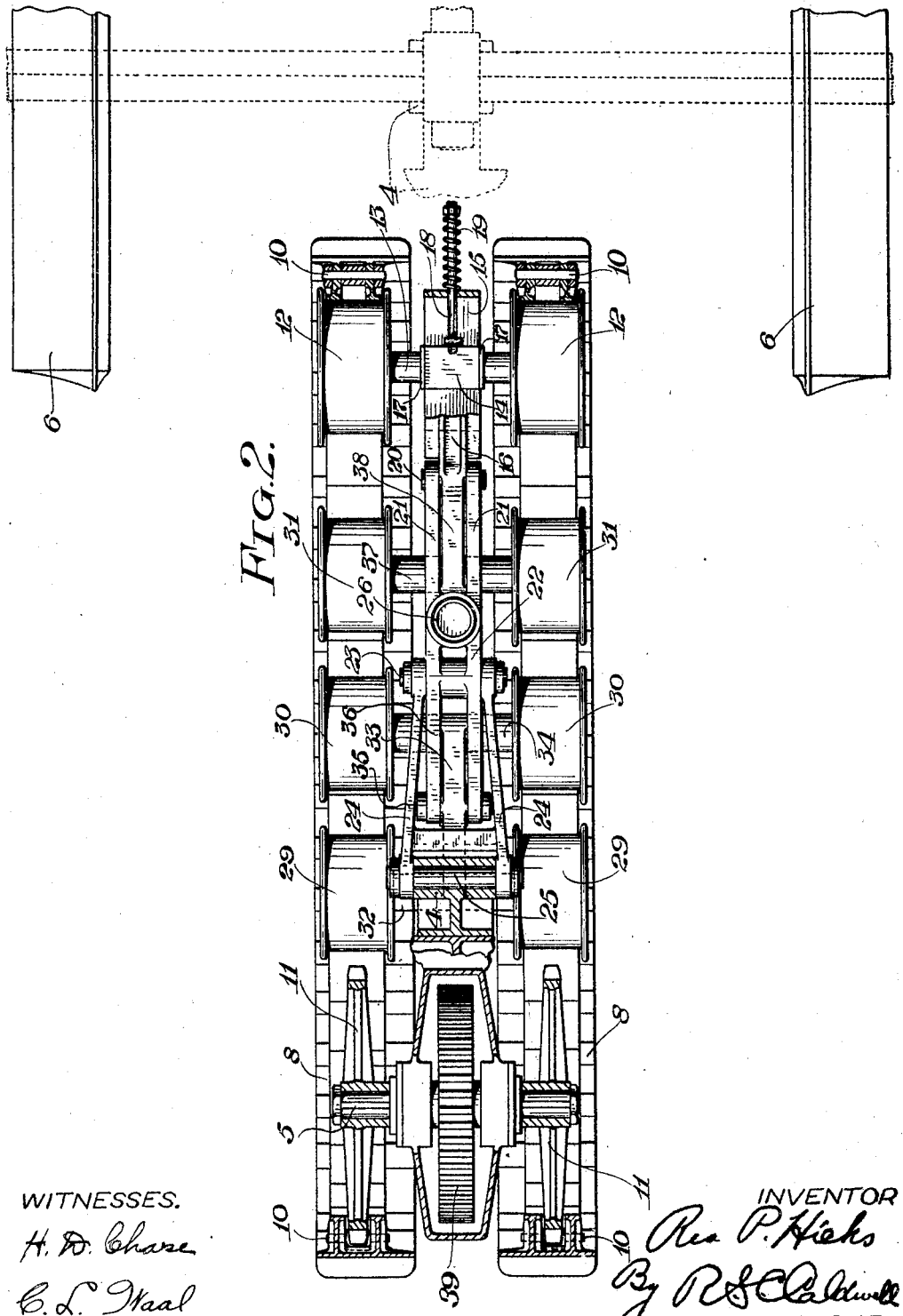

UNITED STATES PATENT OFFICE.

REX P. HICKS, OF MILWAUKEE, WISCONSIN, ASSIGNOR TO HICKS TRACTOR COMPANY, OF MILWAUKEE, WISCONSIN, A CORPORATION OF SOUTH DAKOTA.

TRACTOR-TREAD.

1,392,417.   Specification of Letters Patent.   Patented Oct. 4, 1921.

Application filed May 12, 1919. Serial No. 296,343.

*To all whom it may concern:*

Be it known that I, REX P. HICKS, a citizen of the United States, and resident of Milwaukee, in the county of Milwaukee and State of Wisconsin, have invented new and useful Improvements in Tractor-Treads, of which the following is a description, reference being had to the accompanying drawings, which are a part of this specification.

The invention relates to tractors and more particularly to the endless tread propelled type of tractor.

One of the objects of this invention is to provide an endless tread which will accommodate itself to rocky or uneven ground by providing a truck construction for the tread which will permit portions of the tread on either side of the obstructions to keep in driving contact with the ground and thereby obtain a better tractive effect than the usual truck construction.

A further object of the invention is to provide an endless tread propelled type tractor in which the truck construction is yieldingly maintained in engagement with the tread.

A further object of the invention is to provide a truck construction for the tread in which the rollers upon which the tread runs are arranged on swinging yokes mounted on a swinging support having a yielding connection with the main tractor frame.

The invention further consists in the several features hereinafter set forth and more particularly defined by claims at the conclusion hereof.

In the drawings:

Figure 1 is a side view of the tractor embodying the invention, parts being broken away; Fig. 2 is a sectional plan view through the tread construction.

The engine 3 and its associated parts are mounted on a frame 4 carrying a rear axle drive shaft 5 and supported in front by wheels 6 and an axle 7. The endless propelling tread extends centrally of the tractor from the rear drive shaft to a position adjacent the front end of the machine and the wheels 6 are spaced from the tread a distance such as will enable a part of the tractor to straddle the rows between which the tread is moving while the wheels run in the space between these rows and the next rows.

The propelling tread consists of a pair of endless treads 8, the truck construction, and means for driving said treads.

Each endless tread 8 consists of tread links 9 pivotally secured together by pivot pins 10 to form an endless chain which runs over a sprocket 11 mounted on the shaft 5. The sprockets 11 form wheels or rollers over which the treads run and by which they are driven. The treads form endless tracks, portions of which are being laid in front or in the rear to propel the tractor forward or rearward.

Each tread 8 runs over the sprocket 11 and over an end roller 12 which is moved outwardly to tension the tread and maintain it in extended position.

The rollers 12 are mounted on a shaft 13 journaled in a bearing 14 slidably mounted in a slot 15 in the front end of a lever 16, said bearing having guide flanges 17 adjacent the slot and carrying a rod 18. This rod passes through the forward end of the slot and carries a tensioning spring 19 bearing against the end of the lever 16. The lever 16 is pivotally connected intermediate its ends by a pin 20 to the forked forward ends 21 of a lever 22. This lever 22 is in turn pivotally connected intermediate its ends by a pin 23 to the free ends of a swinging yoke spacing bar or link 24 which is pivotally connected by a pin 25 to the frame 4. Between the pins 23 and 20 on the lever 22 is a spring seat 26 receiving one end of a heavy spring 27 which is mounted at its other end in a socket 28 in the frame 4.

The spring 19 acts to move the shaft 13 and rollers 12 forwardly to tension the treads and the spring 27 bearing upon the lever 22 and through it exerting pressure upon the levers 33 and 16 also assists in holding the lever 16 in extended position, and consequently causes the rollers 12 to hold against the tread.

The lower run of each tread runs on rollers 29, 30 and 31. The rollers 29 of the treads are mounted on a shaft 32 carried by one arm of a lever 33 and the rollers 30 of the treads are mounted on a shaft 34 carried by the other arm of the lever 33 which is pivotally mounted intermediate its ends upon a pin 35 carried by the rear end 36 of the lever 22. The rollers 31 of the treads are mounted on a shaft 37 carried by the rearwardly extending arm 38 of the lever 16.

From the foregoing description it will be noted that the rollers 29 raise or lower with the lowering or raising of the rollers 30 on the swinging of the lever 33 about the pin 35; that the rollers 12 raise or lower with the lowering or raising of the rollers 31 on the swinging of the lever 16 about the pin 20; that the sets of rollers 29 and 30 may raise or lower with the lowering and raising of both sets of rollers 31 and 12 on the swinging of the lever 22 about the pin 23 and that all the rollers may be raised or lowered by the swinging of the link 24 about the pivot 25. It will also be noted that the spring 27 acts to hold the lever 22 in lower position and consequently the rollers associated therewith against the treads.

By reason of this provision for movement of the sets of rollers with respect to each other and their movement altogether, a very flexible tread is produced which will enable the machine to creep over rocks or other obstructions and maintain portions of the tread in propelling contact with the ground on either or both sides of the obstruction. Furthermore the single spring 27 serves to exert a yielding pressure against the whole system of levers forming a swinging articulated frame and which act as an equalizer to distribute the spring pressure over the rollers and thus apply pressure to the tread along its running length to maintain it in extended driving condition.

The treads are driven by a driving connection between gear 39 on the shaft 5 and the engine 3, the particular driving connection not being shown in detail as it does not form a part of the present invention.

With the present construction also it will be observed that the weight of the tractor is applied through the shaft 5 onto the sprocket wheels 11 and through the shaft 7 onto the wheels 6 so that the front wheels and rear portions of the tread carries the load and the forward tread portion is yieldingly held in gripping contact with the ground to pull the tractor in the desired direction and this of course facilitates the flexible movement of the tread in the manner previously described.

In the usual rigid type of truck construction for the treads when the tractor meets with an obstruction the whole machine has to be lifted by the passage of the running length of the tread over it, while in the present construction the front portions of the treads pass over the obstruction and the tractor is not lifted until the rear part of the tread on the sprockets 11 passes over the obstruction.

Various changes may be made in the construction and arrangement of parts shown without departing from the spirit and scope of the invention and I, therefore, desire it to be understood that this invention is not limited to any specific form or arrangement of parts except as such limitations are specified in the claims.

What I claim as new and desire to secure by Letters Patent is:

1. In a tractor, the combination, with a frame, of an endless tread, a drive wheel therefor, a link pivotally connected to said frame, a lever medially pivoted to the end of said link, levers medially pivoted to the ends of said lever, shafts mounted on the ends of said last named levers, tread engaging rollers mounted on said shafts, and spring means interposed between the first lever and said frame and exerting pressure against said rollers through said levers.

2. In a tractor, the combination, with a frame, of an endless tread, a drive wheel therefor, a link pivotally connected to said frame, a lever medially pivoted to the end of said link, levers medially pivoted to the ends of said lever, shafts mounted on the ends of said last named levers, and tread engaging rollers mounted on said shafts.

3. In a tractor, the combination, with a frame, of a drive shaft journaled thereon, a pair of sprockets mounted on said shaft in spaced relation, endless treads driven by said sprockets, truck rollers for said treads, an equalizer for said rollers, and spring means interposed between said frame and equalizer.

4. In a tractor, the combination with the main frame, of a drive shaft journaled thereon, a sprocket mounted on said shaft, a swinging truck frame, a front tread roller and intermediate tread rollers carried by said truck frame, an endless tread running over said sprocket and rollers, a link providing a spaced pivotal connection between the main frame and the swinging frame, and spring means interposed between said frames.

5. In a tractor, the combination with the main frame, of a rear tread roller carried by said frame, a truck frame comprising a swinging frame and a plurality of sets of rollers including a front tread roller swingingly mounted on said truck frame, an endless tread running over said rollers, and spring means interposed between said truck frame and the main frame to yieldingly hold said rollers in contact with the tread and the tread in extended position.

6. In a tractor, the combination, with a frame, of an endless tread, a truck for said tread comprising rollers bearing on the tread and an articulated equalizer connected to said rollers, and spring means interposed between said equalizer and frame and maintaining the tread in extended position.

7. In a tractor, the combination of a main frame, a rear tread roller carried by said frame, front and intermediate rollers, an endless tread running over said rollers, and a truck carrying said front and intermediate tread rollers comprising a swinging truck frame and a swinging link connecting said truck frame to said main frame.

In testimony whereof, I affix my signature, in presence of two witnesses.

REX P. HICKS.

Witnesses:
R. S. C. CALDWELL,
H. D. CHASE.